United States Patent

[11] 3,591,066

[72] Inventor Norman G. Young
409 S. Commonwealth, Apt. 12, Los Angeles, Calif. 90005

[21] Appl. No. 813,147
[22] Filed Apr. 3, 1969
[45] Patented July 6, 1971

[54] DIRECTLY MAILABLE DEVICE HOUSING A MAGNETIC RECORDING MEDIUM

9 Claims, 5 Drawing Figs.

[52] U.S. Cl. .......... 226/89, 179/100.2
[51] Int. Cl. .......... G11b 23/06
[50] Field of Search .......... 226/89, 90, 91, 181, 168; 179/100.2; 242/197; 226/118

[56] References Cited

UNITED STATES PATENTS

| | | | |
|---|---|---|---|
| 3,176,580 | 4/1965 | Metz | 179/100.2 |
| 3,306,510 | 2/1967 | Brumbaugh | 226/118 |
| 3,340,369 | 9/1967 | Seidl | 179/100.2 |

*Primary Examiner*—Allen N. Knowles
*Attorney*—Fraser and Bogucki

ABSTRACT: A flat, letter size housing contains a recording medium in the form of an endless loop. The medium is adapted to move within a guide channel past a pressure pad and a spring-biased pinch roller disposed within the housing and recessed or set back from one edge of the housing a sufficient distance to protect the medium during handling and mailing of the device. The transducing head and a single drive capstan are introduced into the housing, for cooperation with the recording medium opposite the pressure pad and pinch roller, through a narrow slot arrangement coupling the one edge of the housing and the guide channel.

PATENTED JUL 6 1971

3,591,066

INVENTOR.
NORMAN G. YOUNG
BY
Fraser & Bogucki
ATTORNEYS

DIRECTLY MAILABLE DEVICE HOUSING A MAGNETIC RECORDING MEDIUM

BACKGROUND OF THE INVENTION

This invention relates generally to magnetic recording and playback devices and particularly to recording and playback devices that are directly mailable, requiring no mailing envelopes or other mailing containers.

It is often desirable to communicate by mail with devices employing magnetic recording media such as tape or wire. This form of communication has many advantages. For example, the time necessary to record the message is considerably less than the time it would take to write or type a message of similar length and it is more efficient from the standpoint of being able to transmit substantially greater quantities of information than by letter. One example of the commercial applications of this mode of communication is the transmittal to a vendor of a relatively short length of magnetic recording tape having recorded thereon high density digital information pertaining to a multitude of complex purchase orders.

In the past, recorded messages have been mailed by sending a reel of tape or a tape cartridge in a suitable mailer or other container. The process involved, including the preparation of the tape for mailing, and in the case of a single reel, the installation of the reel on a suitable playback device, is both time consuming and relatively expensive, the cost factor becoming especially important when it is necessary to send recorded messages in large quantities.

In the case of some devices of the prior art, a number of special precautions must be taken to protect exposed tape surfaces from damage during handling thereby further adding to the complexity and cost of the mailing operation.

SUMMARY OF THE INVENTION

The present invention overcomes the disadvantages associated with prior schemes for mailing recorded messages by providing a device which may be mailed directly without the use of mailing envelopes or other mailing containers. No preparation for mailing is required other than addressing and attaching the proper postage. The cost of fabrication of the device is so little that the device is expendable and can even be discarded, if desired, after only a single use.

According to another broad aspect of the present invention, the recording medium carried by the device is made easily accessible to the transducing head and recording medium drive means while virtually complete protection of the recording medium surface during handling is simultaneously provided.

According to certain of the more specific aspects of the invention, there is provided a flat, letter size housing dimensioned and fabricated of material suitable for direct mailing. The housing defines an internal chamber for storing a portion of a magnetic recording medium in the form of an endless loop. The housing also contains a pressure pad and a pinch roller both of which are positioned near one edge of the housing but set back a distance therefrom. Also defined within the housing is a narrow channel for guiding the recording medium from the chamber past the pressure pad and the pinch roller and back to the chamber. A transducing head and a means for driving the recording medium are adapted to be introduced into the housing through a slot arrangement in alignment with the pressure pad and pinch roller and leading from the earlier-mentioned housing edge to the channel.

The slot arrangement may take the form of a pair of parallel, spaced slots and the recording medium drive means may be a capstan having a concentric drive shaft of smaller diameter than the capstan. The slot receiving the capstan and its shaft has a T-shaped cross section, the wider portion of the slot being adapted to receive the capstan and the narrower portion of the slot being adapted to receive the capstan drive shaft. The portion of the slot receiving the drive shaft terminates at a point short of the channel to conceal the recording medium and preclude exposure of the medium and consequent damage thereto during handling.

Further specific aspects of the present invention relate to deflection means within the chamber positioned adjacent the recording medium entry and exit ports for effecting a smooth transition of the recording medium from the chamber to the guide channel and from the guide channel to the chamber, and tensioning pads on opposite sides of the guide channel within the portion of the channel feeding the tape to the transducing head.

BRIEF DESCRIPTION OF THE DRAWINGS

Further aspects and advantages of the present invention will become apparent from a reading of the detailed description which follows when taken in conjunction with the accompanying drawings in which.

DETAILED DESCRIPTION

Figures 1, 2, 3, 4, 5:
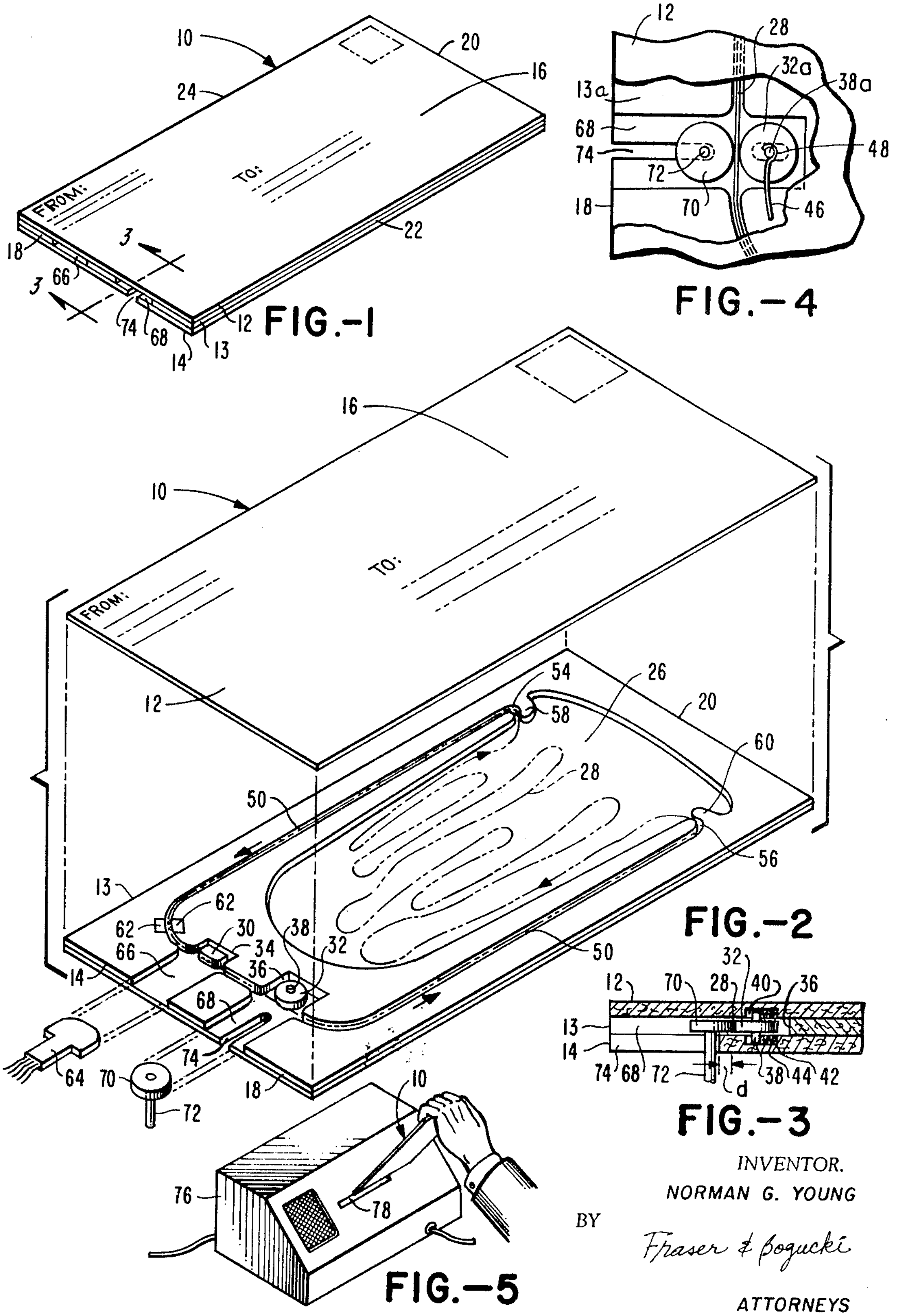
FIG. 1 is a perspective view of the exterior of a directly mailable device housing a magnetic recording medium.
FIG. 2 is an exploded perspective view of the device of FIG. 1.
FIG. 3 is a side elevation view, in section, of a portion of the device of FIG. 1 as seen along the plane 3–3.
FIG. 4 is a plan view, partially broken away, of a portion of an alternative embodiment of the present invention.
FIG. 5 is a perspective view of the device of FIG. 1 during use thereof in conjunction with a recording and playback system.

Referring now to the drawings, and in particular to FIGS. 1—3 thereof, there is shown an embodiment of the present invention comprising a flat housing 10 in the form of a laminated structure including a top layer 12, an intermediate layer 13 and a bottom layer 14. The top layer 12 has an upper surface 16 for receiving address information and postage. The housing further has opposed, parallel end edges 18 and 20 and opposed, parallel side edges 22 and 24.

The housing 10 preferably has a rectangular configuration in plan view and its overall length and width dimensions will typically approximate that of a letter envelope of intermediate size--about 6½ inches by 3½ inches. The overall thickness of the housing 10 is preferably about three-sixteenth inch to one-fourth inch although thicknesses up to about three-eighth inch may be satisfactorily employed. According to one practical example of the invention, the layers 12—14 are of equal thickness, about one-sixteenth inch, and all are fabricated of stiff cardboard or pasteboard. The thicknesses of the layers 12—14 do not, of course, have to be equal and for some applications it may be desirable to use an intermediate layer thicker than each of the top and bottom layers.

The housing 10 defines an internal chamber 26 for storing a portion of a magnetic recording medium 28 in the form of an endless loop. The recording medium 28 is shown in FIG. 2 in phantom. The chamber 26 may conveniently be formed by cutting away or otherwise removing a central portion of the intermediate layer 13.

The recording medium is preferably of the plastic base tape variety, cut very narrow, for example to a width slightly less than one-sixteenth inch where the intermediate layer 13 is one-sixteenth inch thick. Although in the following description the recording medium will be referred to as magnetic tape it will be appreciated that other media such as wire can also be successfully utilized.

As seen in FIG. 2, the portion of the endless tape 28 within the chamber 26 is essentially untensioned, assuming a serpentine configuration consisting of a multitude of loose folds. The tape employed in the device of the present invention is of a thickness sufficient to embody a degree of structural strength to minimize the tendency of the tape to crease or kink and permit the tape to be advanced back into the chamber 26 under a slight compressive stress without buckling. It has been found that standard, plastic base recording tape having a thickness of about 0.015 inch will suffice for this purpose.

Disposed within the housing 10 near the edge 18 are a pressure pad 30 and a pinch roller 32. These elements may be housed with generally rectangular cutouts 34 and 36 formed in the intermediate layer 13. The roller 32, as best shown in FIG. 3, is rotatably mounted on a spindle 38 journaled within longitudinally extending slots 40 and 42 provided in the top and bottom layers 12 and 14, respectively.

In the embodiment depicted in FIG. 3 the pinch roller 32 is resiliently biased toward the edge 18 by a pair of small coil springs 44 mounted within the slots 40 and 42 and bearing against the spindle 38. It will be apparent that other elements for resiliently biasing the spindle may be used in place of the coils 44, such as small pads of rubber or the like pressed into the slots 40 and 42, and it is not intended to limit the present invention to any specific biasing arrangement.

FIG. 4 shows a pinch roller 32*a* biased in an alternative fashion, in this case by a flat spring 46 having one end anchored in the intermediate layer 13*a* and its other end 48 partially looped about the pinch roller spindle 38*a* which is free to move longitudinally, within limits, in slots formed in the top and bottom layers as already described.

Returning now to the embodiment of FIGS. 1—3, in its movement past the pressure pad 30 and pinch roller 32, the tape travels within, and is guided by, a narrow, generally U-shaped channel 50 extending between a tape exit port 54 and a tape entry port 56, these ports communicating with the chamber 26 near the end edge 20 of the housing 10. Projecting into the chamber 26 adjacent the ports 54 and 56, and forming part of the intermediate layer 13, are deflectors 58 and 60 respectively. The deflectors 58 and 60 are provided with smoothly curved surfaces for guiding and directing the tape and providing a smooth transition of the tape path from the chamber 26 into the channel 50 via the exit port 54 and from the channel 50 into the chamber 26 via the entry port 56. In this connection, it should be further noted that all corners which may be contacted by the tape, including all corners within the chamber 26 and those defined by the cutouts 34 and 36, are smoothly rounded to reduce binding and minimize wear of the oxide surface of the tape.

Although the slight drag induced during movement of the tape 28 within the portion of the channel 50 leading to the pressure pad 30 is normally sufficient to tension the tape to obtain proper transducing contact, it may be found necessary to incorporate additional tensioning means along the tape path. This may be accomplished by installing within appropriate cutouts in the intermediate layer 13 a pair of opposed tensioning pads 62 of felt or other suitable material and projecting slightly into the channel 50 to lightly contact the faces of the tape 28.

A thin transducing head 64, whose basic features are well-known in the art and which may incorporate within a single unit the functions of recording, playback and erasing, is employed. A slot 66 extending parallel with the side edges 22 and 24 is formed in the intermediate layer 13 between end edge 18 and channel 50 in alignment with the pressure pad 30 to provide access to the tape 28 for the head 64. Similarly, a second slot 68 cut out of the intermediate layer 13 and running parallel with the slot 66 and in alignment with the pinch roller 32, provides access to the tape for a tape drive means which may take the form of a capstan 70. The capstan 70 is secured to a capstan drive shaft 72 adapted to be rotatably driven by suitable means (not shown). A third slot 74 for receiving the drive shaft 72 is formed in the bottom layer 14 parallel to and in central alignment with the slot 68.

The head 64 and capstan drive means 70, 72 are, in practice, housed along with appropriate electronic circuitry, a capstan drive motor and transmission, a speaker and other equipment, within a cabinet 76 such as that depicted in FIG. 5. For recording or playback, the housing 10 is inserted end-wise, edge 18 first, into an elongated opening 78 in the front panel of the cabinet 76. The head 64 and capstan drive means 70, 72 slide into the housing via the slots 66, 68 and 74, into transducing and driving contact with the tape 28, the tape being pressed into frictional contact with the capstan 70 by the spring-loaded pinch roller 32. It will be appreciated that the portion of the tape traveling past the pressure pad 30 and pinch roller 32 is recessed considerably from the end edge 18 with access to the tape being limited and obtained essentially only through the very narrow slots 66 and 68. In one practical example, the portion of the tape path paralleling the edge 18 is set back about three-fourth inch from the edge 18. Further in accordance with this example, the slot 66 is about one-half inch wide, the slot 68 is about one-fourth inch wide, and both of these slots are one-sixteenth inch in height. The slot 74 is about one-sixteenth inch wide and extends back about twenty-one-thirty-seconds inch from the edge 18.

With the tape concealed in this fashion, it is virtually completely protected during handling of the device and during its transmittal through the mails. It will thus also be appreciated that although the slots 66 and 68 may be combined into a single slot, this will be less desirable since the chances of damage to the tape would thereby be increased and the strength of the portion of the housing 10 adjacent the edge 18 might be impaired as this portion will be more subject to being crushed or otherwise deformed.

Further in connection with the desirability of protecting the tape during handling, the tape drive means 70, 72 preferably has a T-shaped cross section, with the capstan 70 having a substantially larger diameter than the drive shaft 72. As best shown in FIG. 3, the capstan overhang thereby provided permits termination of the innermost end of the slot 74 short of the tape 28, the dimension "*d*" in FIG. 3 denoting the distance between the oxide surface of the tape 28 and the innermost extremity of the slot 74. Thus, during normal handling and use the tape is well protected.

What I claim is:

1. A directly mailable recording and playback device comprising:

a flat letter size housing dimensioned and fabricated of material suitable for direct mailing, said housing defining a chamber for storing a portion of a magnetic recording medium in the form of an endless loop, said housing containing a pressure pad and pinch roller near one edge of said housing but set back therefrom, said housing further defining a narrow channel for guiding said medium from said chamber past said pressure pad and said pinch roller and back to said chamber, said channel being set back from said edge, and slot means, defined by said housing, said slot means having upper, lower and sidewalls and connecting said edge and said guide channel, for receiving a transducing means and recording medium drive means for cooperation with said medium, said slot means being in alignment with said pressure pad and said pinch roller, said recording medium being thereby protected during handling and mailing of said device.

2. A device, as defined in claim 1, in which:

said slot means comprises a pair of parallel, spaced slots, one for receiving said transducing means and the other for receiving said medium drive means.

3. A device, as defined in claim 1, in which:

said recording medium drive means is a capstan and associated capstan drive shaft, said capstan having a larger diameter than said shaft and in which the slot for receiving the capstan and capstan shaft has a T-shaped cross section, the wider portion of the slot being adapted to receive the capstan and the narrower portion of the slot being adapted to receive the capstan drive shaft, the portion of the slot receiving the capstan drive shaft terminating at a point short of the recording medium guide channel to preclude exposure of the medium and consequent damage thereto during handling of the device.

4. A device, as defined in claim 1, in which:

said guide channel communicates with the chamber at oppositely disposed entry and exit ports in a portion of the chamber distal said one edge of said housing.

5. A device, as defined in claim 4, which includes:

means defining inwardly curved surfaces for cooperating with said medium and positioned adjacent said entry and exit ports for guiding and deflecting said recording medium thereby effecting a smooth transition of the path of said medium from the channel into the chamber and from the chamber into the channel.

6. A device, as defined in claim 1, which includes:

means disposed on opposite sides of said recording medium guide channel and located in a portion of said channel between said pressure pad and said exit port for slidably engaging the recording medium to tension the medium during movement, and in which the pinch roller is resiliently biased toward said one edge.

7. A directly mailable recording and playback device comprising:

A flat, letter size housing dimensioned and fabricated of material suitable for direct mailing, said housing having opposed end edges and opposed side edges and comprising a laminated structure including a top layer having an upper surface for receiving mailing information and postage, a bottom layer, and a layer intermediate and joining said top and bottom layers, said intermediate layer having cutouts defining a chamber for storing a portion of a magnetic recording medium in the form of an endless loop, spaces defined by said housing and set back from one end edge of said housing for enclosing a pressure pad and a pinch roller, a narrow channel for guiding said medium from said chamber past said pressure pad and said pinch roller and back to the chamber, said channel communicating with said chamber at entry and exit ports near the other end edge of said housing, said intermediate layer further defining a first slot for receiving a transducing head and extending inwardly parallel to said side edges from said one end edge to the channel and in alignment with the pressure pad, a second slot parallel with the first slot for receiving a rotatable capstan and extending inwardly From the first edge to the channel and in alignment with the pinch roller, the bottom layer defining a third slot in the portion of the bottom layer exposed to the second slot for receiving a capstan drive shaft, the third slot being narrower than the second slot and generally in alignment with the axis of the pinch roller whereby the second and third slots are adapted to receive the capstan and capstan drive shaft having in combination a T-shaped cross section, the third slot terminating at a point short of the guide channel to preclude exposure of the recording medium and consequent damage thereto during handling of the device.

8. A device, as defined in claim 7, in which:

said intermediate layer further defines recording medium deflectors projecting into the chamber adjacent the entry and exit ports, said deflectors having inwardly curved surfaces for cooperating with said recording medium for effecting smooth transition of said medium from said channel into said chamber and from said chamber to said channel.

9. A device, as defined in claim 7, in which:

said pinch roller has a spindle journaled in slots formed in the inside surfaces of the top and bottom layers and extending generally parallel with the side edges, and means operatively associated with the spindle for resiliently biasing the pinch roller toward said one end edge.